Feb. 6, 1968    H. J. ORR    3,368,118
MANUAL BYPASS FOR METER SOCKETS
Filed April 25, 1966
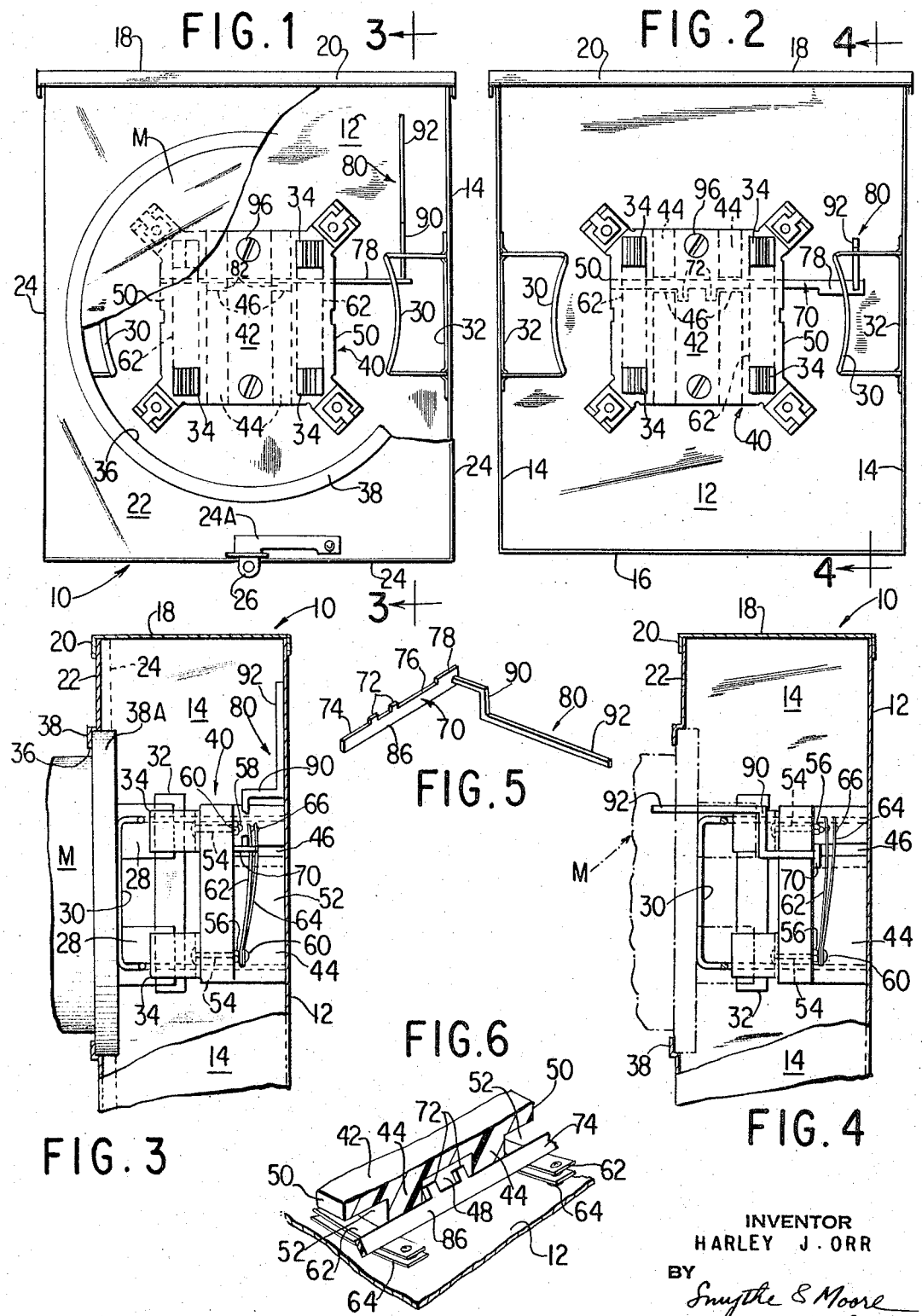
INVENTOR
HARLEY J. ORR
BY
Smythe & Moore
ATTORNEYS

United States Patent Office 3,368,118
Patented Feb. 6, 1968

3,368,118
MANUAL BYPASS FOR METER SOCKETS
Harley J. Orr, Bedford, N.H., assignor to Sola Basic Industries, Inc., Milwaukee, Wis., a corporation of Wisconsin
Filed Apr. 25, 1966, Ser. No. 544,982
6 Claims. (Cl. 317—108)

This invention relates to meter sockets and more particularly to a socket for detachable watt-hour meters or the like in which a manually operable bypass is provided to assure continuity of electric current to a consumer when the meter is detached.

It is common practice today to measure the consumption of electrical energy from a public power source by means of a watt-hour meter or the like detachably mounted in a socket device connected to the incoming power lines on one side and to the outgoing load lines on the other side. When a meter is mounted in the socket, an electrical connection is established through the meter from the incoming to the outgoing lines. When the meter is removed for testing, repairs, replacement, or the like, however, the load circuit is broken, thereby frequently causing inconvenience to the consumer, if not a highly undesirable condition as in the case of a hospital or where food is cooking on an electric range. Various devices have been proposed, both automatically and manually operated, therefore, to bypass the open circuit when the meter is removed. Such devices, however, have not been entirely satisfactory, or have been relatively expensive to manufacture or difficult to repair or replace.

An object of the present invention is to provide an inexpensive meter socket provided with a manually operable bypassing mechanism that is simple in construction and easy to repair.

A further object of the invention is to provide a unitary bypassing meter socket structure that is removable and replaceable as a unit and in which the bypassing mechanism is readily accessible for repair upon removal of the socket unit.

A still further object of the invention is to provide a unitary socket and manually operated bypassing mechanism of the character above described which is particularly adapted for use in a ringless type of meter socket.

Still another object of the invention is to provide a socket and manually operated bypassing mechanism for ringless type meter sockets which must be operated to a non-bypassing condition before the cover of the meter socket can be placed in position.

In one aspect of the invention, the meter socket comprises a housing, a removable cover for the housing, a molded base member of insulating material removably mounted in the housing and having spring jaw sockets or contacts for detachably receiving contact blades of a meter mounted thereon, electrical contacts of the leaf spring type for bridging or bypassing certain of the jaw contacts, an operating member for effecting opening and closing of the bridging contacts, and a manually operated lever for effecting opening and closing movement of the operating member for the bridging contacts, such lever being of such configuration that the movable cover for the socket housing cannot be replaced until the lever is operated to a non-bypassing condition.

The foregoing and other objects, features and advantages of the invention will be apparent from the following description and accompanying drawings which exemplify a preferred embodiment of the invention.

In the drawings:

FIG. 1 is an elevational view of the socket with a meter attached, as mounted on a vertical supporting surface with a part of the cover member of the socket housing and the meter cut away and showing the manually operated lever in its normal non-bypassing position;

FIG. 2 is a similar view with the cover removed and the manually operated lever in a bypassing position;

FIG. 3 is a sectional view taken on the line 3—3 of FIG. 1 with the manually operated lever in non-bypassing position;

FIG. 4 is a sectional view similar to FIG. 3 taken on the line 4—4 of FIG. 2, with the manually operated lever in a bypassing position;

FIG. 5 is a perspective view of the manually operated lever and the contact actuating bar of FIGS. 1–4; and FIG. 6 is a fragmental view in perspective, showing portions of the socket base member, the bypassing contact means, and the operating bar for the bypassing contacts.

Referring to the drawings in which like reference numerals refer to like parts in the several views, the socket illustrated is of the ringless type and comprises a housing 10 of generally rectangular shape having a rear wall 12, side walls 14, a bottom wall 16, and a top wall 18 having an overlying lip or flange 20. A cover member 22 having side and bottom flanges 24 is insertable under the lip or flange 20 of housing 10 and is adapted to be secured in a closed position by a latch 24A having a hole 26 for receiving a seal or the like (not shown). A watt-hour or like meter M (FIG. 3) having a plurality of contact blades 28 is insertable into the open front of housing 10 when the cover member 22 is removed. Meter M rests against a pair of wire-like bails 30 removably attached to the sides 14 of housing 10 by spring clips 32 with the blade contacts 28 received within and clamped by spring jaw contact members 34 mounted on a base member 40. The cover member 22 is provided with a circular opening 36 through which the glass or other body portion of meter M projects and normally retains the meter against unauthorized removal by means of a flange 38 overlying a cooperating outwardly extending flange 38A provided on the base of meter M.

The structure thus far described is generally similar to that shown in U.S. Patent 3,171,909 to Foskett. The present invention distinguishes from this patent, however, in the structure of the socket base member 40 and in the bypassing mechanism for providing shunt circuits across certain of the spring jaw contacts 34 when the meter M is detached or removed. Thus, in accordance with the present invention, the spring contact jaws 34 and the entire bypassing mechanism are mounted on a single unitary base member 40 for installation within, and removal from, the socket housing 10 as a unit. If it becomes necessary to repair or replace one of the parts, the entire unit can be readily removed from the housing for easily working thereon, or the entire unit can be replaced by a new subassembly.

The unitary base member 40 is preferably molded from a suitable electrically insulating material and comprises a body member or portion 42 of generally rectangular shape as viewed in FIGS. 1 and 2, and a pair of spaced, longitudinally extending legs 44 which depend downwardly from the bottom of body 42 toward the rear wall 12 of housing 10. Each of the legs 44 is formed in two sections to provide transversely extending slots 46 therein as best shown in FIGS. 3 and 4. As illustrated in FIGS. 1 and 2 and best shown in FIG. 6, the legs 44 are not only spaced apart to provide a space 48 therebetween, but are also set inwardly of the side edges 50 of body portion 42 to provide longitudinally extending spaces 52 between the bottom of body 42 and the inside of the rear wall 12 of housing 10.

The spring contact jaws 34 are mounted on the upper side of base member 40 adjacent the four corners of body portion 42 and are secured in position by bolts or the like 54 extending entirely through the body member into the spaces 52 therebeneath and fastened by nuts 56 or the like. Two of the bolts 54 (those on the right in FIGS. 3 and 4) project downwardly beyond the nuts 56 and are rounded to form contact points 58 (FIG. 3), or contact points of a hardened material may be welded or otherwise attached to the ends of bolts 54. The other two bolts (those on the left in FIGS. 3 and 4) are counterbored and threaded to receive screws 60. Alternatively, each pair of bolts and screws 54 and 60 may comprise a single screw extending upwardly through member 42 and secured by nuts or the like on the upper side of the body member, with the members 56 providing spacers.

Each of the screws 60 supports one end of a pair of flat spring members 62 and 64 which extend longitudinally of the body member 42 in the spaces 52 therebeneath and comprise bridging or shunting conductors between respective pairs of jaw contacts 34. While a single resilient member made a suitable electrically conducting spring material can be utilized for the bridging members 62 and 64, it is preferable to use two members, the member 62 comprising the principal bridging or shunting conductor and the member 64 comprising a suitably bowed or flexed leaf spring normally urging the member 62 into a contact closing position with the contact point 58, as illustrated in FIG. 4. The free or contact-making end of member 62 is also preferably provided with a depression 66, FIGS. 3–6, for receiving the point 58.

The leaf spring contact means 62, 64 is operated into contact opening and closing positions by a flat bar member 70 which is stamped or otherwise formed from a sheet of thermoplastic or other rigid insulating material, and which extends transversely of the base 40 in the slots 46 provided beneath the body portion 42 by the sectional legs 44. As best shown in FIGS. 2, 5 and 6, the operating bar 70 is of generally rectangular cross section and is provided with a pair of laterally projecting fingers 72, contact operating portions 74 and 76, and a widened portion 78 to which the manually operated actuating lever 80 is attached. When the operating bar 70 is assembled in base member 40, fingers 72 are positioned in the space 48 between legs 44, FIGS. 2 and 6, and cooperate with guide means or slot 46, FIGS. 1 to 4, to hold the operating bar in proper transverse position. At the same time, the leaf spring contact members 62 and 64 which extend under the bar 70 retain the operating bar or member in assembled position on the unitary base member. The thickness of bar 70 and nuts or spacers 56 is such that when the operating bar 70 lies flat against the bottom of body portion 42 in its bypassing or shunting position as shown in FIGS. 2 and 4, the contacts 58 and 66 are closed by leaf spring 64 to cause conducting member 62 to bridge a pair of the adjacent contact jaws 34. The width of bar 70 at the portions 74 and 76 which overlie the respective pairs of bridging members 62, 64 is such, however, that when bar 70 is tilted or rotated into a vertical position (FIGS. 1 and 3), the spring-like bridging members 62, 64 are operated into a contact open position as shown in FIG. 3. In moving into the flat (contact-closing) and vertical (contact-opening) positions, the operating bar 70 tilts or rotates about its rear edge 86 (FIGS. 5 and 6) with the bottom of body member 42 and the rear walls of slots 46 forming a fulcrum. Since bar 70 extends entirely across body or base member 42, it simultaneously operates both pairs of bridging members 62, 64 on the opposite sides of the member to open and close both pairs of contacts 58 and 66 simultaneously to open or close a bridging or shunt circuit across the respective pairs of spring contact jaws 34.

As best shown in FIG. 5, the manually operated lever 80 for actuating the operating bar 70 is provided with an offset or right angularly bent portion 90 adjacent the bar 70 to cause the extended hand-gripping or handle portion 92 to lie in an accessible position for manual operation when the cover 22 of housing 10 is removed and to clear bail 30. The total length of lever 80 is such that when it is rotated or moved in the direction of the arrow in FIG. 5 to a shunting or bypassing position, the handle portion 92 extends outwardly beyond the open front of housing 10 as shown in FIG. 4, so that the cover 22 cannot be replaced until lever 80 is operated into the non-bridging or non-bypassing position of FIGS. 1 and 3. The length of portion 78 of bar 70, FIG. 5, is such that lever 80 is not disposed beneath meter M. The entire unitary socket device 40 including base member 42, spring contact jaws 34, bridging members 62, 64, operating bar 70 and actuating level 80, is detachably mounted on the rear wall 12 of housing 10 by any suitable means such as screws 96.

The operation of the invention will be apparent from the foregoing description. When it is desired to remove a meter M from the meter socket of housing 10 for inspection, repair, replacement or the like, the cover 22 is first removed and handle portion 92 of lever 80 is then readily accessible for manual movement or operation of the lever 80 to the meter bypassing position of FIGS. 2 and 4. This movement of lever 80 actuates the operating bar 70 into a position permitting closing of contacts 58 and 66 and effecting a bridging or shunting of respective pairs of the jaw contacts by members 62, 64. The input circuit from a power line to a load circuit is thus maintained closed through the socket while the meter is removed, it being understood that the incoming power lines (not shown) would be connected to one set of contacts 34 and the outgoing load lines (also not shown) would be connected to the opposite contacts 34 of each pair. When it is desired to replace the meter, the lever 80 must be moved or operated to its non-bypassing position of FIGS. 1 and 3 before the cover 2 can be replaced. This actuates bar 70 to cause opening of contacts 58 and 66 and opening of the bridging or shunting circuit through spring members 62, 64. If it is necessary to repair or to replace any of the parts of the meter socket structure, the entire socket mechanism can be easily removed as a unit by merely removing the screws or the like 96 which attach the base or body member 42 to the rear wall 12 of housing 10. The various parts of the socket are then readily accessible for being worked upon, or if desired, an entirely new socket can be readily installed.

While a preferred embodiment of the invention has been shown and described, it will be apparent that various changes and modifications can be made without departing from the spirit of the invention, and it is intended that the invention be limited only by the scope of the appended claims.

What is claimed is:

1. An electric meter socket of the ringless types comprising the combination of a housing, a cover member for closing said housing, an insulating base member, a plurality of spring jaw contacts mounted on said base member, movable leaf spring contact means cooperating with stationary contacts for electrically bridging at least two pairs of said jaw contacts mounted on said base member, an elongated operating member mounted on said base member adjacent said contact means, means supporting said operating member for arcuate angular movement about an axis extending longitudinally of the member, means on said operating member cooperating with said contact means for effecting opening and closing movement of said contact means upon movement of the operating member from one angular position to another, and a manually operable lever means connected to said operating member for actuating said operating member to effect opening and closing of said contact means to a non-bridging and bridging position, respectively, said lever means extending into the closing path of said cover upon operation of the lever to close said contact means, whereby the cover member cannot be closed unless the lever is operated into said non-bridging position.

2. The combination set forth in claim 1 in which said operating member for effecting openings and closing movement of said contact means comprises a flat bar of insulating material having a substantially rectangular cross section.

3. The combination as set forth in claim 2 in which said operating member fulcrums on the base member about a longitudinally extending edge of the operating member to effect arcuate angular movement of said operating member.

4. The combination set forth in claim 1 in which said base member comprises a body member having longitudinally extending leg portions providing a space beneath the body member adjacent each side edge thereof and a transversely extending slot, a pair of said contact jaws is mounted on the upper surface of said body member above each of said spaces, said leaf spring contact means is mounted on the underside of said body member within each of said spaces, and said operating member extends transversely of the body member within said slot.

5. The combination set forth in claim 4 in which said operating member is positioned between said leaf spring contact means and the underside of the body member.

6. The combination set forth in claim 1 in which said base member comprises a body member having a pair of spaced longitudinally extending legs providing spaces beneath the body member adjacent each side edge thereof and between the legs, each of said legs being provided with a transversely extending slot, a pair of said contact jaws is mounted on the upper surface of said body member above each of said spaces adjacent the side edges of the body member, said leaf spring contact means is mounted on the underside of said body member within each of said last named spaces, said operating member extends transversely of the body member within said slots and between said leaf spring contact means and the underside of the body member, and said operating member is provided with laterally extending fingers positioned to be received within said space between said legs.

References Cited

UNITED STATES PATENTS

| | | | |
|---|---|---|---|
| 2,921,154 | 1/1960 | Foskett | 200—51.1 |
| 3,164,751 | 1/1965 | Lewis | 317—108 |
| 3,171,909 | 3/1965 | Foskett | 200—51.1 |

ROBERT K. SCHAEFER, *Primary Examiner.*

M. GINSBURG, *Assistant Examiner.*